US012347371B2

(12) United States Patent
Meng et al.

(10) Patent No.: US 12,347,371 B2
(45) Date of Patent: Jul. 1, 2025

(54) PIXEL CIRCUIT DETECTION METHOD, DISPLAY PANEL DRIVING METHOD, AND DISPLAY DEVICE

(71) Applicants: Hefei BOE Joint Technology Co., Ltd., Hefei (CN); BOE Technology Group Co., Ltd., Beijing (CN)

(72) Inventors: Song Meng, Beijing (CN); Xuehuan Feng, Beijing (CN)

(73) Assignees: HEFEI BOE JOINT TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/313,457

(22) Filed: May 8, 2023

(65) Prior Publication Data

US 2023/0274695 A1 Aug. 31, 2023

Related U.S. Application Data

(63) Continuation of application No. 17/361,549, filed on Jun. 29, 2021, now Pat. No. 11,682,347.

(30) Foreign Application Priority Data

Oct. 16, 2020 (CN) ......................... 202011108314.5

(51) Int. Cl.
*G09G 3/3225* (2016.01)
*G09G 3/3208* (2016.01)
*G09G 3/3233* (2016.01)

(52) U.S. Cl.
CPC ... *G09G 3/3225* (2013.01); *G09G 2300/0819* (2013.01); *G09G 2310/08* (2013.01)

(58) Field of Classification Search
None
See application file for complete search history.

(56) References Cited

U.S. PATENT DOCUMENTS 11,107,407 B2 * 8/2021 Xu ........................ G09G 3/3266
2015/0130859 A1 * 5/2015 Yang .................... G09G 3/3233
345/690

(Continued)

FOREIGN PATENT DOCUMENTS

CN 103578411 A 2/2014
CN 106097969 A 11/2016

(Continued)

OTHER PUBLICATIONS

Notice of Allowance from U.S. Appl. No. 17/361,549 dated Feb. 9, 2023.

(Continued)

*Primary Examiner* — Sepehr Azari
(74) *Attorney, Agent, or Firm* — Calfee, Halter & Griswold LLP

(57) ABSTRACT

The present disclosure relates to the field of display technology, and describes a pixel driving circuit detection method, a display panel, a driving method thereof, and a display device. The detection method includes inputting a reference voltage to the data line during at least part of the initial phase; turning on the first and second switch sub-circuits during the charging phase, to input the detection voltage to the data line, while inputting the reset voltage to the sensing line; turning on the second switch sub-circuit during the charging phase, to input the driving current by the driving transistor to the sensing line under the effect of the detection voltage; turning off the first and second switch sub-circuits during the detection phase, to detect the voltage on the sensing line; and obtaining the mobility of the driving (Continued)

transistor according to the voltage on the sensing line detected in the detection phase.

18 Claims, 10 Drawing Sheets

(56) References Cited

U.S. PATENT DOCUMENTS

| | | | | |
|---|---|---|---|---|
| 2016/0041690 | A1 | 2/2016 | Kyu et al. | |
| 2016/0042690 | A1* | 2/2016 | Chang | G09G 3/3258 345/212 |
| 2016/0071445 | A1* | 3/2016 | Kim | G09G 3/3291 345/212 |
| 2016/0189630 | A1* | 6/2016 | Chang | G09G 3/3291 345/76 |
| 2016/0203764 | A1 | 7/2016 | Kimg et al. | |
| 2017/0004764 | A1* | 1/2017 | Kim | G09G 3/3233 |
| 2018/0061316 | A1* | 3/2018 | Shin | G09G 3/3275 |
| 2018/0322829 | A1* | 11/2018 | Xie | G09G 3/3233 |
| 2020/0074939 | A1* | 3/2020 | Kim | G09G 3/3233 |
| 2021/0074210 | A1* | 3/2021 | Yuan | G09G 3/3233 |
| 2021/0142726 | A1* | 5/2021 | Xu | G09G 3/3258 |
| 2021/0210000 | A1* | 7/2021 | Lee | G09G 3/32 |
| 2021/0383763 | A1* | 12/2021 | Kim | H10K 59/131 |
| 2021/0390908 | A1* | 12/2021 | Zhang | G09G 3/3258 |
| 2022/0013072 | A1* | 1/2022 | Kim | G09G 3/3266 |

FOREIGN PATENT DOCUMENTS

| | | | |
|---|---|---|---|
| CN | 108597449 | A | 9/2018 |
| CN | 109215581 | A | 1/2019 |
| CN | 110808011 | A | 2/2020 |
| CN | 110969989 | A | 4/2020 |
| CN | 11179844 | A | 5/2020 |
| CN | 111179853 | A | 5/2020 |

OTHER PUBLICATIONS

Office action from U.S. Appl. No. 17/361,549 dated Oct. 28, 2022.
Office action from U.S. Appl. No. 17/361,549 dated Jun. 14, 2022.
Office action from Chinese Application No. 202011108314.5 dated Apr. 6, 2023.

* cited by examiner

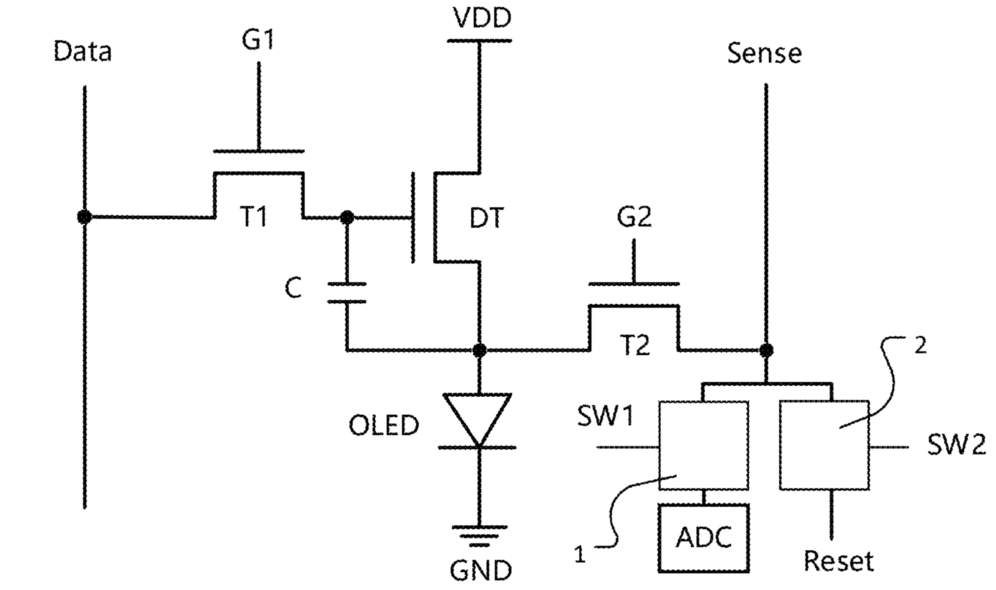
Fig. 1 – Prior Art
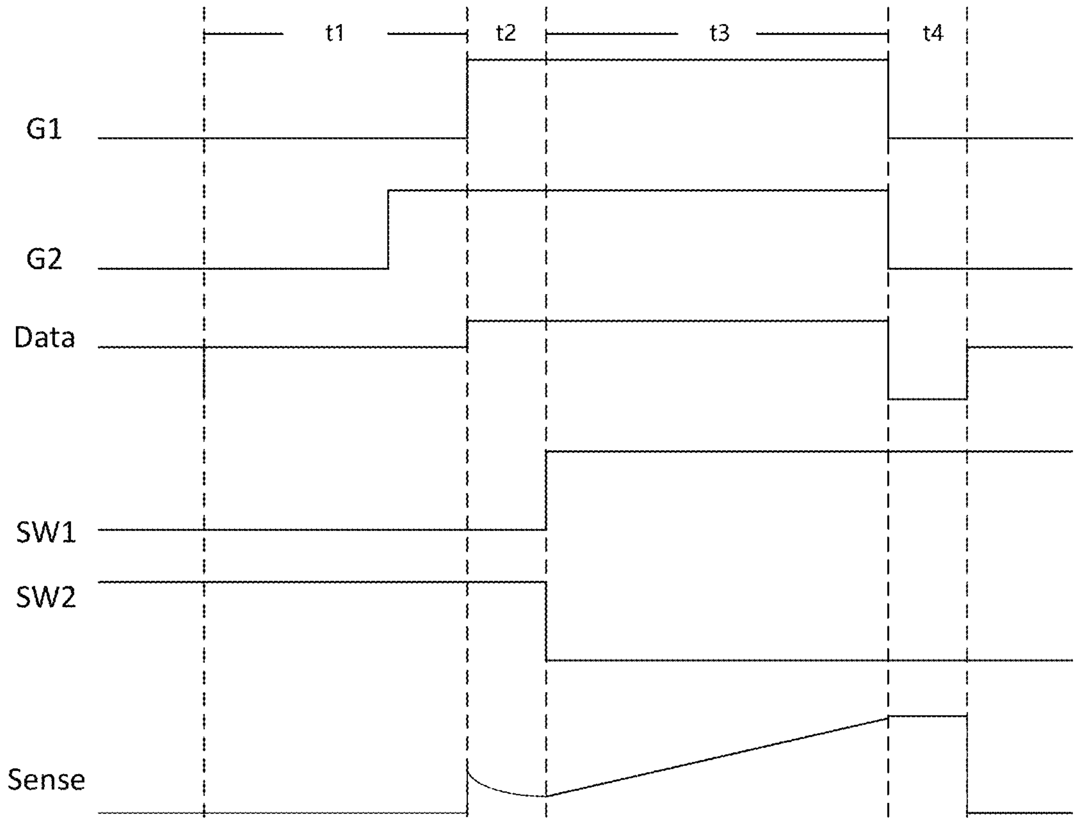
Fig. 2 – Prior Art

PIXEL CIRCUIT DETECTION METHOD, DISPLAY PANEL DRIVING METHOD, AND DISPLAY DEVICE

CROSS-REFERENCE TO RELATED APPLICATION

The present application is a Continuation Application of U.S. patent application Ser. No. 17/361,549 filed on Jun. 29, 2021, which claims the benefit of and priority to Chinese Patent Application No. 202011108314.5 filed on Oct. 16, 2020, the entire disclosure of both are incorporated herein as a part of the present application for all purposes.

TECHNICAL FIELD

The present disclosure relates to the field of display technology and, in particular to a pixel driving circuit detection method, a display panel driving method, and a display device.

BACKGROUND

In an OLED display panel, the light-emitting unit OLED is a current-type driving device, and the magnitude of the current directly determines the brightness of the OLED. In the related art, the pixel driving circuit inputs a preset driving current to the OLED light-emitting unit by controlling the gate voltage of the driving transistor. However, due to the differences in the output characteristics of the driving transistors in each pixel driving circuit, and the change over time of the output characteristics of the driving transistors, it is usually necessary to compensate the data signal of the pixel driving circuit by an external compensation circuit, so as to ensure the uniformity in the output characteristics of the driving transistors in the display panel.

It should be noted that the information disclosed in the background art section above is only used to enhance the understanding of the background of the present disclosure, and therefore may include information that does not constitute the prior art known to those of ordinary skill in the art.

BRIEF SUMMARY

According to an aspect of the present disclosure, a pixel driving circuit detection method is provided. The pixel driving circuit includes a first switch sub-circuit, a driving transistor, a second switch sub-circuit, and a capacitor. A first terminal of the first switch sub-circuit is connected to a data line, and the second terminal of the first switch sub-circuit is connected to the gate of the driving transistor. The first terminal of the driving transistor is connected to the first power terminal, and the second terminal of the driving transistor is connected to the first terminal of the second switch sub-circuit. The second terminal of the second switch sub-circuit is connected to the sensing line, and an electrode of the capacitor is connected to the gate of the driving transistor. The pixel driving circuit detection method includes:

- inputting a reference voltage to the data line during at least a part of the initial period, so that the initial voltage on the data line changes toward the reference voltage, wherein the reference voltage is different from the initial voltage;
- turning on the first switch sub-circuit and the second switch sub-circuit during the reset phase, to input a detection voltage to the data line, while inputting a reset voltage to the sensing line;
- turning on the second switch sub-circuit during the charging phase, to input a driving current by the driving transistor to the sensing line under the effect of the detection voltage;
- turning off the first switch sub-circuit and the second switch sub-circuit during the detection phase, to detect the voltage on the sensing line; and
- obtaining the mobility of the driving transistor according to the voltage on the sensing line detected during the detection phase.

In an exemplary embodiment of the present disclosure, the pixel driving circuit is applied into a display panel, and the initial phase, the reset phase, the charging phase, and the detection phase are located in blank phases between adjacent frames. At the initial moment of the initial phase, the data line maintains the driving voltage of the last row of the previous frame.

In an exemplary embodiment of the present disclosure, the pixel driving circuit is applied into a display panel, the display panel includes a plurality of pixel driving circuits, and the reference voltage is greater than the driving voltage of the data line connected to any pixel driving circuit during any initial period, or the reference voltage is less than the driving voltage of the data line connected to any pixel driving circuit during any initial phase.

In an exemplary embodiment of the present disclosure, the pixel driving circuit is applied into a display panel, and the display panel includes a plurality of pixel driving circuits. The detection method includes: inputting different reference voltages to the data line for multiple times during at least a part of the initial phase, wherein among the two reference voltages inputted adjacently in time, one of the two reference voltages is greater than the driving voltage of the data line connected to any pixel driving circuit during any initial phase, and the other of the two reference voltages is less than the driving voltage of the data line connected to any pixel driving circuit during any initial phase.

In an exemplary embodiment of the present disclosure, the input of different reference voltages to the data line for multiple times includes: according to a time sequence:

- inputting a first reference voltage to the data line in the first period; and
- inputting a second reference voltage to the data line in the second period, wherein
- the first reference voltage is greater than the driving voltage of the data line connected to any pixel driving circuit during any initial phase, and the second reference voltage is less than the driving voltage of the data line connected to any pixel driving circuit during any initial phase.

In an exemplary embodiment of the present disclosure, the input of different reference voltages to the data line for multiple times includes: according to a time sequence:

- inputting a first reference voltage to the data line in the first period;
- inputting a second reference voltage to the data line in the second period; and
- inputting a third reference voltage to the data line in the third period, wherein
- the first reference voltage is less than the driving voltage of the data line connected to any pixel driving circuit during any initial phase, the second reference voltage is greater than the driving voltage of the data line connected to any pixel driving circuit during any initial phase, and the third reference voltage is less than the driving voltage of the data line connected to any pixel driving circuit during any initial phase.

In an exemplary embodiment of the present disclosure, the time duration of the first period is T11, the time duration of the second period is T12, the time duration of the third period is T13, the time duration of the reset phase is T2, the time duration of the charging phase is T3, and the time duration of the detection phase is T4, wherein T11: T12=a*(T2: T3), where $1<a<2$; T12: T13=b*(T3: T4), where $0<b<1$; and T11: T12<T13: T12.

In an exemplary embodiment of the present disclosure, the ratio of the time duration of the first period to the time duration of the second period is 2:4-2:6; and the ratio of the time duration of the second period to the time duration of the third period is 4:3-6:3.

In an exemplary embodiment of the present disclosure, the input of different reference voltages to the data line for multiple times includes: according to a time sequence, inputting a first reference voltage to the data line in the first period; and inputting a second reference voltage to the data line in the second period, wherein the first reference voltage is less than the driving voltage of the data line connected to any pixel driving circuit during any initial phase, and the second reference voltage is greater than the driving voltage of the data line connected to any pixel driving circuit during any initial phase.

In an exemplary embodiment of the present disclosure, the time duration of the first period is T11, the time duration of the second period is T12, the time duration of the reset phase is T2, and the time duration of the charging phase is T3, wherein T11: T12=c*(T2: T3), where $1<c<2$.

In an exemplary embodiment of the present disclosure, the ratio of the time duration of the first period to the time duration of the second period is 1:2-1:4.

In an exemplary embodiment of the present disclosure, in the charging phase, the detection method further includes: turning on the first switch sub-circuit.

In an exemplary embodiment of the present disclosure, in the charging phase, the detection method further includes: turning off the first switch sub-circuit.

In an exemplary embodiment of the present disclosure, the initial phase includes a source reset phase, and in the source reset phase, the detection method further includes: inputting the reset voltage to the sensing line while turning on the second switch sub-circuit.

In an exemplary embodiment of the present disclosure, the pixel driving circuit is further connected to the third switch sub-circuit and the fourth switch sub-circuit. The first terminal of the third switch sub-circuit is connected to the sensing line, the second terminal of the third switch sub-circuit is connected to the reset signal end, and the control terminal of the third switch sub-circuit is connected to the first control signal terminal. The first terminal of the fourth switch sub-circuit is connected to the sensing line, the second terminal of the fourth switch sub-circuit is connected to the sensing signal terminal, and the control terminal of the fourth switch sub-circuit is connected to the second control signal terminal. The reset signal terminal is configured to input a reset voltage to the sensing line, and the sensing signal terminal is configured to sense the voltage on the sensing line.

In an exemplary embodiment of the present disclosure, calculating the mobility of the driving transistor according to the voltage on the sensing line detected during the detection phase, includes:

calculating the mobility K of the driving transistor according to the formula of $I=K(Vgs-Vth)^2=CV/t$, where I represents the output current of the driving transistor during the charging phase, Vgs represents the gate-source voltage difference of the driving transistor, Vth represents the threshold voltage of the driving transistor, C represents the capacitance value of the sensing line itself, V represents the voltage value on the sensing line detected during the detection phase, and t represents the time duration of the charging phase.

In an exemplary embodiment of the present disclosure, the detection voltage input to the data line is equal to the sum of a preset voltage and a threshold voltage, wherein the threshold voltage is the threshold voltage of the driving transistor connected to the data line. In detection of the mobility of different transistors and in detection of the mobility of the same driving transistor for different times, the preset voltage remains the same.

In an exemplary embodiment of the present disclosure, the voltage on the sensing line before the initial phase is not equal to the reset voltage.

According to an aspect of the present disclosure, there is provided a display panel driving method. The display panel includes a plurality of pixel driving circuits, and the display panel driving method includes:

using the aforementioned pixel driving circuit detection method to detect the mobility of driving transistors in different pixel driving circuits; and compensating, in the driving phase, the data signal of the pixel driving circuit where the driving transistor is located according to the mobility of the driving transistor, wherein in detection of the mobility of different driving transistors, the reference voltages having the same timing magnitude are input to the data line during the initial phase, and in detection of the mobility of the same driving transistor for different times, the reference voltages having the same timing magnitude are input to the data line during the initial phase.

In an exemplary embodiment of the present disclosure, the display panel includes a plurality of pixel driving circuits distributed in an array, a plurality of data lines and a plurality of sensing lines extending in a column direction, a plurality of first gate lines extending in a row direction, and a second gate line. The pixel driving circuits of the same column are connected to the same sensing line and the same data line, the control terminals of the first switch sub-circuits in the same row of pixel driving circuits are connected to the same first gate line, and the control terminals of the second switch sub-circuits in the same row of pixel driving circuits are connected to the same second gate line. The display panel driving method includes: using the first gate line to turn on the first switch sub-circuits row by row, and using the second gate line to turn on the second switch sub-circuits row by row, so that the pixel driving circuit detection method described above is used to perform detection on the pixel driving circuits row by row.

In an exemplary embodiment of the present disclosure, the initial phase, the reset phase, the charging phase, and the detection phase are located in the blank phases between adjacent frames, and the display panel driving method further includes: in each of the blank phases, performing detection on at least one row of the pixel driving circuits.

According to an aspect of the present disclosure, there is provided a display panel that is driven by the above-mentioned display panel driving method.

According to an aspect of the present disclosure, there is provided a display device including a plurality of pixel driving circuits and a detection sub-circuit. Each pixel driving circuit includes: a second switch sub-circuit, a driving transistor, a first switch sub-circuit, and a capacitor. The second terminal of the second switch sub-circuit is connected to the sensing line. The first terminal of the driving transistor is connected to the first power terminal, and the second terminal of the driving transistor is connected to the first terminal of the second switch sub-circuit. The first terminal of the first switch sub-circuit is connected to the data line, and the second terminal of the first switch sub-circuit is connected to the gate of the driving transistor. An electrode of the capacitor is connected to the gate of the driving transistor. The detection sub-circuit is used to detect the mobility of the driving transistor in the pixel driving circuit. The detection sub-circuit is specifically configured to: input a reference voltage to the data line during at least part of the initial phase, so that the initial voltage on the data line changes toward the reference voltage, wherein the reference voltage is different from the initial voltage; turn on the first switch sub-circuit and the second switch sub-circuit during the reset phase, to input the detection voltage to the data line, while inputting the reset voltage to the sensing line; turn on the second switch sub-circuit during the charging phase, to iput a driving current by the driving transistor to the sensing line under the effect of the detection voltage; turn off the first switch sub-circuit and the second switch sub-circuit during the detection phase, to detect the voltage on the sensing line; and obtain the mobility of the driving transistor according to the voltage on the sensing line detected during the detection phase.

In an exemplary embodiment of the present disclosure, in detection of the mobility of different driving transistors, the detection sub-circuit inputs the reference voltages having the same timing magnitude to the data line, and in detection of the mobility of the same driving transistor for different times, the detection sub-circuit inputs the reference voltages having the same timing magnitude to the data line.

In an exemplary embodiment of the present disclosure, the detection sub-circuit includes:

- a source driving circuit, connected to the pixel driving circuit through the data line; and
- a timing controller, connected to the source driving circuit and used to control the source driving circuit to input the reference voltage and the detection voltage to the data line.

In an exemplary embodiment of the present disclosure, the initial phase, the reset phase, the charging phase, and the detection phase are located in the blank phases between adjacent frames, and at the initial moment of the initial phase, the data line maintains the driving voltage of the pixel driving circuit in the last row of the previous frame.

In an exemplary embodiment of the present disclosure, the reference voltage is greater than the driving voltage of the data line connected to any pixel driving circuit during any initial phase, or the reference voltage is less than the driving voltage of the data line connected to any pixel driving circuit during any initial phase.

In an exemplary embodiment of the present disclosure, the detection sub-circuit is configured to input different reference voltages to the data line for multiple times during at least a part of the initial phase, wherein

- among the two reference voltages inputted adjacently in time, one of the two reference voltages is greater than the driving voltage of the data line connected to any pixel driving circuit during any initial phase, and the other of the two reference voltages is less than the driving voltage of the data line connected to any pixel driving circuit during any initial phase.

In an exemplary embodiment of the present disclosure, the input of different reference voltages to the data line for multiple times includes: according to a time sequence,

- inputting a first reference voltage to the data line in the first period; and
- inputting a second reference voltage to the data line in the second period, wherein
- the first reference voltage is greater than the driving voltage of the data line connected to any pixel driving circuit during any initial phase, and the second reference voltage is less than the driving voltage of the data line connected to any pixel driving circuit during any initial phase.

In an exemplary embodiment of the present disclosure, the input of different reference voltages to the data line for multiple times includes: according to a time sequence,

- inputting a first reference voltage to the data line in the first period;
- inputting a second reference voltage to the data line in the second period; and
- inputting a third reference voltage to the data line in the third period, wherein
- the first reference voltage is less than the driving voltage of the data line connected to any pixel driving circuit during any initial phase, the second reference voltage is greater than the driving voltage of the data line connected to any pixel driving circuit during any initial phase, and the third reference voltage is less than the driving voltage of the data line connected to any pixel driving circuit during any initial phase.

In an exemplary embodiment of the present disclosure, the time duration of the first period is T11, the time duration of the second period is T12, the time duration of the third period is T13, the time duration of the reset phase is T2, the time duration of the charging phase is T3, and the time duration of the detection phase is T4, wherein $T11: T12=a^*(T2: T3)$, where $1<a<2$; $T12: T13=b^*(T3: T4)$, where $0<b<1$; and $T11: T12<T13: T12$.

In an exemplary embodiment of the present disclosure, the ratio of the time duration of the first period to the time duration of the second period is 2:4-2:6; and the ratio of the time duration of the second period to the time duration of the third period is 4:3-6:3.

In an exemplary embodiment of the present disclosure, the input of different reference voltages to the data line for multiple times includes: according to a time sequence, inputting a first reference voltage to the data line in the first period; and inputting a second reference voltage to the data line in the second period, wherein the first reference voltage is less than the driving voltage of the data line connected to any pixel driving circuit during any initial phase, and the second reference voltage is greater than the driving voltage of the data line connected to any pixel driving circuit during any initial phase.

In an exemplary embodiment of the present disclosure, the time duration of the first period is T11, the time duration of the second period is T12, the time duration of the reset phase is T2, and the time duration of the charging phase is T3, wherein $T11: T12=c^*(T2: T3)$, where $1<c<2$.

In an exemplary embodiment of the present disclosure, the ratio of the time duration of the first period to the time duration of the second period is 1:2-1:4.

In an exemplary embodiment of the present disclosure, the detection sub-circuit is further configured to: turn on the first switch sub-circuit during the charging phase.

In an exemplary embodiment of the present disclosure, the detection sub-circuit is further configured to: turn off the first switch sub-circuit during the charging phase.

In an exemplary embodiment of the present disclosure, the initial phase includes a source reset phase, and the detection sub-circuit is further configured to:

input the reset voltage to the sensing line during the source reset phase, while turning on the second switch sub-circuit.

In an exemplary embodiment of the present disclosure, the detection sub-circuit further includes a third switch sub-circuit and a fourth switch sub-circuit. The first terminal of the third switch sub-circuit is connected to the sensing line, the second terminal of the third switch sub-circuit is connected to the reset signal terminal, and the control terminal of the third switch sub-circuit is connected to the first control signal terminal. The first terminal of the fourth switch sub-circuit is connected to the sensing line, the second terminal of the fourth switch sub-circuit is connected to the sensing signal terminal, and the control terminal of the fourth switch sub-circuit is connected to the second control signal terminal. The reset signal terminal is used to input a reset voltage to the sensing line, and the sensing signal terminal is used to sense the voltage on the sensing line.

In an exemplary embodiment of the present disclosure, calculating the mobility of the driving transistor according to the voltage on the sensing line detected during the detection phase includes:

calculating the mobility K of the driving transistor according to the formula of $I=K(Vgs-Vth)^2=CV/t$, where I represents the output current of the driving transistor during the charging phase, Vgs represents the gate-source voltage difference of the driving transistor, Vth represents the threshold voltage of the driving transistor, C represents the capacitance value of the sensing line itself, V represents the voltage value on the sensing line detected during the detection phase, and t represents the time duration of the charging phase.

In an exemplary embodiment of the present disclosure, the detection voltage input to the data line is equal to the sum of a preset voltage and a threshold voltage, wherein the threshold voltage is the threshold voltage of the driving transistor connected to the data line. In detection of the mobility of different driving transistors and in detection of the mobility of the same driving transistor for different times, the preset voltage remains the same.

In an exemplary embodiment of the present disclosure, the voltage on the sensing line before the initial phase is not equal to the reset voltage.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a part of the specification, show embodiments in accordance with the present disclosure, and are used together with the specification to explain the principle of the present disclosure. Understandably, the drawings in the following description are only some embodiments of the present disclosure. For those of ordinary skill in the art, other drawings can be obtained based on these drawings without creative work.

FIG. 1 is a schematic structural diagram of a pixel driving circuit in the related art;

FIG. 2 is a timing diagram for each node when mobility detection is performed on the pixel driving circuit in the related art;

DETAILED DESCRIPTION

Figure 3:
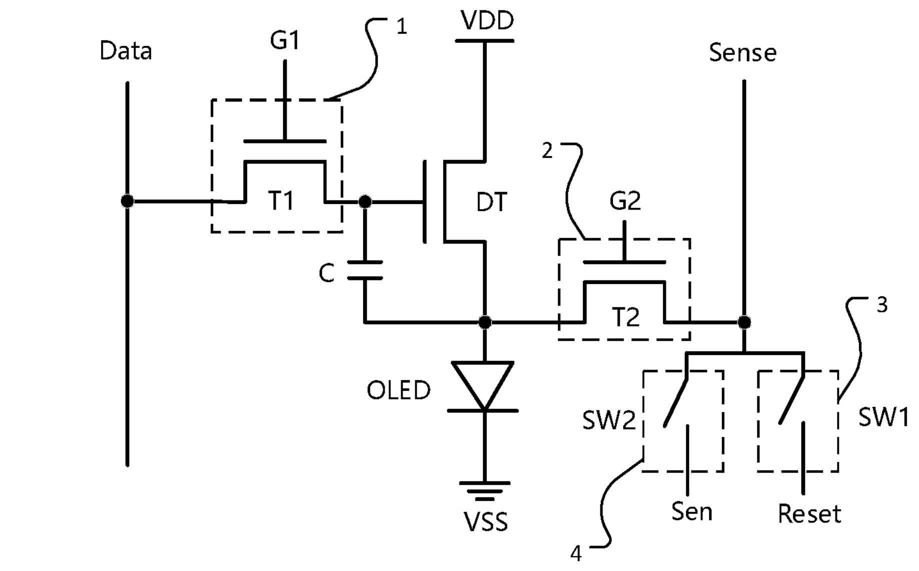
FIG. 3 is a schematic structural diagram of a pixel driving circuit in a pixel driving circuit detection method according to an exemplary embodiment of the present disclosure.

Example embodiments will now be described more fully with reference to the accompanying drawings. However, the example embodiments can be implemented in various forms, and should not be construed as being limited to the examples set forth herein. On the contrary, the provision of these embodiments makes the present disclosure more comprehensive and complete, and fully conveys the concept of the example embodiments to those skilled in the art. The same reference numerals in the figures indicate the same or similar structures, and thus their detailed descriptions will be omitted.

Although relative terms such as "upper" and "lower" are used in the specification to describe the relative relationship between one component and another component, these terms are used in the specification only for convenience, for example, based on the example direction as shown in the drawings. It can be understood that if a device is turned over and turned upside down, the component described as "upper" will become the "lower" component. Other relative terms, such as "high", "low", "top", "bottom", "left" and "right" have similar meanings. When a structure is "on" another structure, it may mean that a certain structure is integrally formed on the other structure, or that a certain structure is "directly" installed on the other structure, or that a certain structure is "indirectly" installed on the other structure through a third structure.

The terms "a", "an", and "the" are used to indicate the existence of one or more elements, components, etc. The terms "include" and "have" are used to indicate the open-ended meaning of inclusion and mean that in addition to the listed elements, composition divisions, etc., there may be other elements, composition divisions, tc.

In the related art, it is usually necessary to compensate the output characteristics of the driving transistor by detecting the threshold voltage and mobility of the driving transistor. When detecting the mobility, it is necessary to detect the voltage on the sensing line connected to the output terminal of the driving transistor, so as to obtain the mobility of the driving transistor.

However, the sensing line connected to the pixel driving circuit is usually arranged in parallel with the data line, and the voltage change on the data line will cause a coupling effect on the voltage of the sensing line, thereby affecting the detection accuracy of the mobility of the driving transistor.

As shown in FIGS. 1 and 2, FIG. 1 is a schematic structural diagram of a pixel driving circuit in the related art, and FIG. 2 is a timing diagram for each node when mobility detection is performed on the pixel driving circuit in the related art. As shown in FIG. 1, the pixel driving circuit includes a first switch transistor T1, a second switch transistor T2, a driving transistor DT, and a capacitor C. The first terminal of the first switch transistor T1 is connected to the data line Data, and the second terminal of the first switch transistor T1 is connected to the gate of the driving transistor DT. The gate is connected to the first control signal terminal G1. The first terminal of the driving transistor DT is connected to the first power terminal VDD, and the second terminal of the driving transistor DT is connected to an electrode of a light-emitting unit OLED, where the other electrode of the light-emitting unit OLED is connected to the ground terminal GND. The first terminal of the second switch transistor T2 is connected to the second terminal of the driving transistor DT, and the second terminal of the second switch transistor T2 is connected to the sensing line Sense. The gate is connected to the second control signal terminal G2. The capacitor C is connected between the gate and the second terminal of the driving transistor DT. The sensing line Sense is connected to an analog-to-digital converter ADC through a switch sub-circuit 1, and the sensing line Sense is also connected to a reset signal terminal Reset through a switch sub-circuit 2. Further, the data line and the sensing line connected to the same pixel driving circuit are arranged in parallel, and are located in the same black matrix area between adjacent pixel units. The control terminal of the switch sub-circuit 1 is connected to the control signal terminal SW1, and the control terminal of the switch sub-circuit 2 is connected to the control signal terminal SW2. Besides, the above-mentioned control signal terminals allow the switch sub-circuit connected thereto to be turned on in a high-level state. As shown in FIG. 2, the pixel driving circuit detection method may include an initial phase t1, a reset phase t2, a charging phase t3, and a detection phase t4. To be specific, the initial phase t1, the reset phase t2, the charging phase t3, and the detection phase t4 may be located in the blank phases between adjacent frames of the display panel. In the initial phase t1, the data line Data maintains the driving voltage of the display phase. In the reset phase t2, the first switch transistor T1 and the second switch transistor T2 are turned on, and the data line Data jumps from the driving voltage to the detection voltage, while the reset signal terminal Reset inputs the reset voltage to the sensing line. In the charging phase, the first switch transistor T1 and the second switch transistor T2 are kept on, the data line Data charges the sensing line Sense, and the voltage on the sensing line Sense gradually increases. In the detection phase t4, the first switch transistor T1 and the second switch transistor T2 are turned off, and the external sensing sub-circuit senses the voltage on the sensing line Sense through the analog-to-digital converter ADC, thereby obtaining the mobility of the driving transistor DT through the voltage on the measuring line Sense.

As shown in FIG. 2, in the reset phase t2, the data line Data jumps from the initial driving voltage to the detection voltage, and the sensing line Sense arranged in parallel and adjacent to the data line will also jump under the coupling effect. Even in the reset phase t2, the reset signal terminal Reset inputs the reset voltage to the sensing line, it takes a certain time for the sensing line Sense to charge to the reference voltage, resulting in that the reset effect of the sensing line by the reset signal terminal Reset cannot completely offset the coupling effect of the sensing line by the data line voltage change. At the same time, because the initial driving voltages on different data lines are different, or the initial driving voltages on the same data line in different detection periods are different, the data line has a different degree of coupling effect on the sensing line, when the mobility of different driving transistors is detected or the mobility of the same driving transistor at different times is detected. That is, the sensing line will have a different voltage at the initial moment of the charging phase, which leads to inaccurate detection of the mobility of the driving transistor. For example, when the display panel detects the mobility of the driving transistor in the pixel driving circuit row by row, the initial driving voltage of the first data line is 5V, the initial driving voltage of the second data line is −5V, and the detection voltage is 3V. When the first data line jumps from 5V to 3V during the reset phase, the sensing line adjacent thereto will jump by 2V in the negative direction. When the second data line jumps from −5V to 3V during the reset phase, the sensing line adjacent thereto will jump by 8V in the positive direction. Understandably, the jump voltages of the two sensing lines are different, which causes the two sensing lines to have different voltages at the initial moment of the charging phase. In another example, when a data line first detects the mobility of the driving transistor connected to it, the initial driving voltage is −5V and, when the same data line senses the mobility of the driving transistor connected to it for the second time, the initial driving voltage is −5V. In the same respect, the sensing lines adjacent to this data line have different voltages at the initial moment of the charging phase during the above two detection processes.

Figure 4:
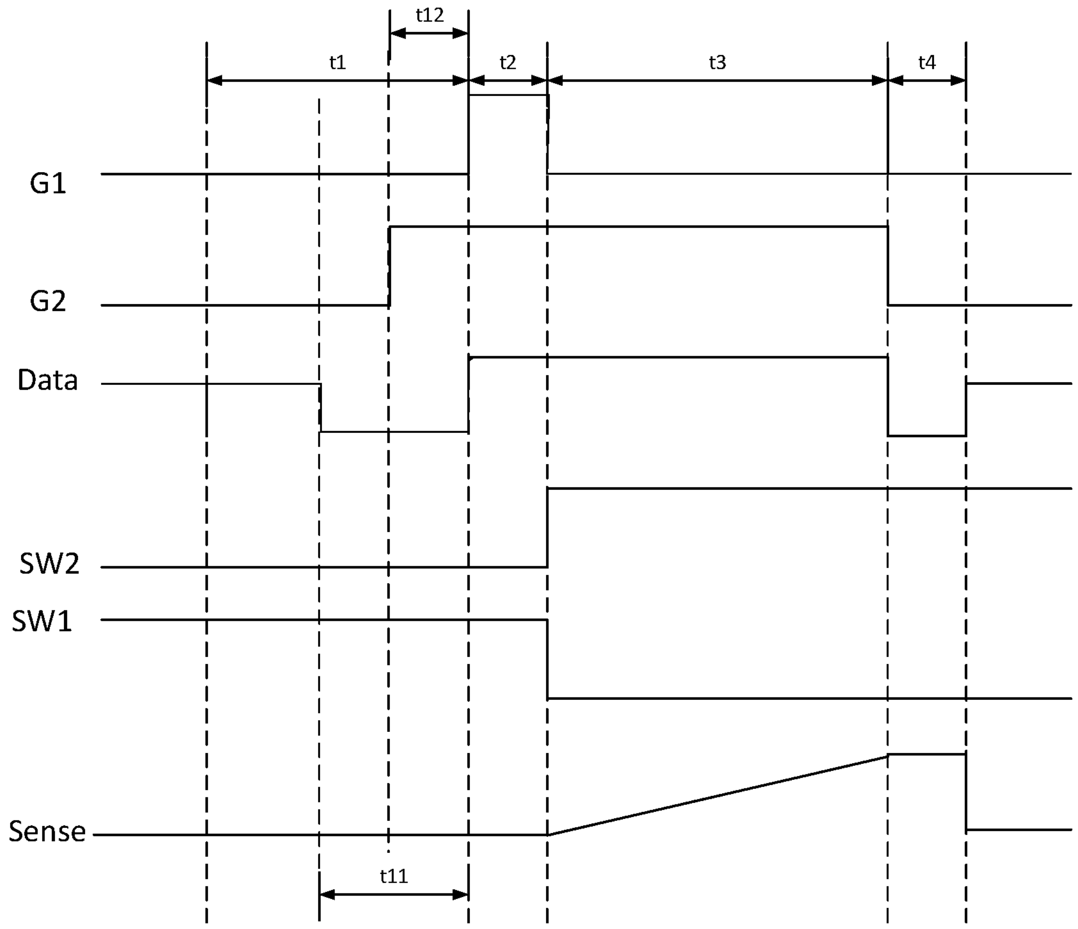
FIG. 4 is a timing diagram for each node in the pixel driving circuit detection method according to an exemplary embodiment of the present disclosure.

In view of the foregoing, an exemplary embodiment provides a pixel driving circuit detection method. A schematic structural diagram of a pixel driving circuit in the pixel driving circuit detection method is shown in FIG. 3 according to an exemplary embodiment of the present disclosure. The pixel driving circuit may include a first switch sub-circuit 1, a driving transistor DT, a second switch sub-circuit 2, and a capacitor C. The first terminal of the first switch sub-circuit 1 is connected to the data line Data, the second terminal of the first switch sub-circuit 1 is connected to the gate of the driving transistor DT, and the control terminal of the first switch sub-circuit 1 can be connected to the first control signal terminal G1. The first terminal of the driving transistor DT is connected to the first power terminal VDD, and the second terminal of the driving transistor DT is connected to the first terminal of the second switch sub-circuit 2. The second terminal of the second switch sub-circuit 2 is connected to the sensing line Sense, and the control terminal of the second switch sub-circuit 2 can be connected to the second control signal terminal G2. An electrode of the capacitor C is connected to the gate of the driving transistor DT. As shown in FIG. 4, a timing diagram for each node in the pixel driving circuit detection method according to an exemplary embodiment of the present disclosure is shown, where G1 represents the timing diagram of the first control signal terminal G1, G2 represents the timing diagram of the second control signal terminal G2, Data represents the timing diagram of the data line, and Sense represents the timing diagram of the sensing line. The pixel driving circuit detection method includes the following.

In at least a part t11 of the initial phase t1, a reference voltage is input to the data line, so that the initial voltage on the data line tends to change toward the reference voltage, wherein the reference voltage is different from the initial voltage.

In the reset phase t2, the first switch sub-circuit 1 and the second switch sub-circuit 2 are turned on, and a detection voltage is input to the data line Data, while a reset voltage is input to the sensing line Sense.

In the charging phase t3, the second switch sub-circuit 2 is turned on, and the driving transistor inputs a driving current to the sensing line Sense under the effect of the detection voltage, so that the voltage on the sensing line Sense gradually rises.

In the detection phase t4, the first switch sub-circuit 1 and the second switch sub-circuit 2 are turned off, and the voltage on the sensing line Sense is detected.

The mobility of the driving transistor is obtained according to the voltage ob the sensing line detected in the detection phase.

According to the pixel driving circuit detection method provided by an exemplary embodiment of the present disclosure, the data line Data connected to the pixel driving circuit is charged to a fixed reference voltage in the initial phase t1. In the display panel, in the mobility detection of different driving transistors, the reference voltages having the same timing magnitude can be input to the data line, and in the mobility detection of the same driving transistor for different times, the reference voltages having the same timing magnitude can be input to the data line. According to the pixel driving circuit detection method, the voltage of the data line connected to the driving transistor tend to the reference voltage in the initial phase, when the mobility detection is performed of any driving transistor in the display panel at any time, thereby improving the problem of inaccurate mobility detection caused by the different voltages on the above sensing line at the initial moment of the charging phase.

The initial voltage on the data line refers to the voltage of the data line at the initial moment of the initial phase t1, and the reference voltage may be greater than or less than the initial voltage of the data line.

In an exemplary embodiment, the pixel driving circuit may be applied into a display panel, and the initial phase, the reset phase, the charging phase, and the detection phase may be located in the blank phases between adjacent frames. At the initial moment of the initial phase, the data line maintains the driving voltage of the last row of the previous frame. It should be understood that the initial phase, the reset phase, the charging phase, and the detection phase may also be located in other phases. As long as the voltages on different data lines are inconsistent in the initial phase or the voltages on the same data line in different detection phases are inconsistent, the corresponding problems can be solved by the above-mentioned pixel driving circuit detection method. For example, the initial phase, the reset phase, the charging phase, and the detection phase may also be in the shutdown phase of the display panel. In an exemplary embodiment, the detection method may also reset the sensing line after the detection phase t4, so as to reset the sensing line to the above-mentioned reset voltage.

In an exemplary embodiment, as shown in FIG. 3, the first switch sub-circuit 1 may include a first switch transistor T1, and the second switch sub-circuit 2 may include a second switch transistor T2. The first switch transistor T1, the second switch sub-circuit 2 and the driving transistor may all be N-type transistors. The other electrode of the capacitor C may be connected to the second terminal of the driving transistor. The second terminal of the driving transistor DT can also be connected to the first terminal of a light-emitting unit OLED, and the second terminal of the light-emitting unit OLED can be connected to the second power terminal VSS. The voltage of the first power terminal VDD may be greater than the voltage of the second power terminal VSS.

In an exemplary embodiment, as shown in FIG. 3, the pixel driving circuit may also be connected to a third switch sub-circuit 3 and a fourth switch sub-circuit 4. The first terminal of the third switch sub-circuit 3 may be connected to the sensing line Sense, the second terminal of the third switch sub-circuit 3 can be connected to the reset signal terminal Reset, and the control terminal of the third switch sub-circuit 3 can be connected to the first control signal terminal SW1. The first terminal of the fourth switch sub-circuit can be connected to the sensing line Sense, the second terminal of the fourth switch sub-circuit can be connected to the sensing signal terminal Sen, and the control terminal of the fourth switch sub-circuit can be connected to the second control signal terminal SW2. To be specific, the reset signal terminal Reset is used to input a reset voltage to the sensing line, and the sensing signal terminal Sen is used to sense the voltage on the sensing line. As shown in FIG. 4, SW1 is the timing diagram of the first control signal terminal SW1, and SW2 is the timing diagram of the second control signal terminal SW1. In the initialization phase t1 and the reset phase t2, the first control signal terminal SW1 can input a turn-on signal, the second control signal terminal SW2 can input a turn-off signal, and the reset signal terminal Reset can input a reset signal to the sensing line during the initialization phase t1 and the reset phase t2. In the charging phase t3 and the detection phase t4, the first control signal terminal SW1 can input a turn-off signal, the second control signal terminal SW2 can input a turn-on signal, and the voltage detection sub-circuit can sense the voltage on the sensing line Sense through the sensing signal terminal Sen during the detection phase t4. It should be understood that an analog-to-digital converter can also be connected between the voltage detection sub-circuit and the sensing signal terminal Sen. The analog-to-digital converter can convert the analog voltage signal on the sensing signal terminal Sen into a digital signal identifiable by the voltage detection sub-circuit.

In an exemplary embodiment, as shown in FIG. 4, the initial phase t1 may further include a source reset phase t12, and the detection method may further include: in the source reset phase t12, turning on the second switch sub-circuit 2 while inputting simultaneously a reset voltage to the sensing line Sense, so as to input a reset signal to the second terminal of the driving transistor DT. This allows an earlier reset of the second terminal of the driving transistor DT in the initial phase, so as to reset the second terminal of the driving transistor in different pixel driving circuits to the same voltage value. Thus, effects on the voltage of the sensing line by the voltage of the second terminal of the driving transistor DT in the reset phase can be avoided.

In an exemplary embodiment, as shown in FIG. 4, the pixel driving circuit detection method may further include: in the charging phase t3, turning off the first switch sub-circuit through the first signal control terminal G1. Therefore, in the charging phase t3, the gate-source voltage difference of the driving transistor DT remains unchanged, and the second terminal of the driving transistor can output a stable current I. The process of obtaining the mobility of the driving transistor according to the voltage on the sensing line detected in the detection phase may include: calculating the mobility K of the driving transistor according to the formula of $I=K(Vgs-Vth)^2=CV/t$, wherein I represents the output current of the driving transistor during the charging phase, Vgs represents the gate-source voltage difference of the driving transistor, Vth represents the threshold voltage of the driving transistor, C represents the capacitance value of the sensing line itself, V represents the voltage value on the sensing line detected during the detection phase, and t represents the time duration of the charging phase. To be specific, the threshold voltage of the driving transistor can be obtained in advance when the display panel is turned off or started. The gate-source voltage difference of the driving transistor may be the detection voltage input by the data signal line to the gate of the driving transistor during the reset phase t2. In this case, the detection voltage may be equal to the sum of a preset voltage and a threshold voltage, wherein the threshold voltage is the threshold voltage of the driving transistor connected to the data line. That is, $I=K(V0+Vth-Vth)^2=CV/t$, where V0 is the preset voltage. Inputting the sum of the preset voltage and the threshold voltage to the data line can eliminate the influence of the threshold voltage of the driving transistor on the output current I of the driving transistor DT, so as to obtain the output current I under the influence of a single variable (mobility K), thereby obtaining accurate mobility K. In the mobility detection of different driving transistors and in the mobility detection of the same driving transistor for different times, the preset voltage remains the same.

Figure 5:
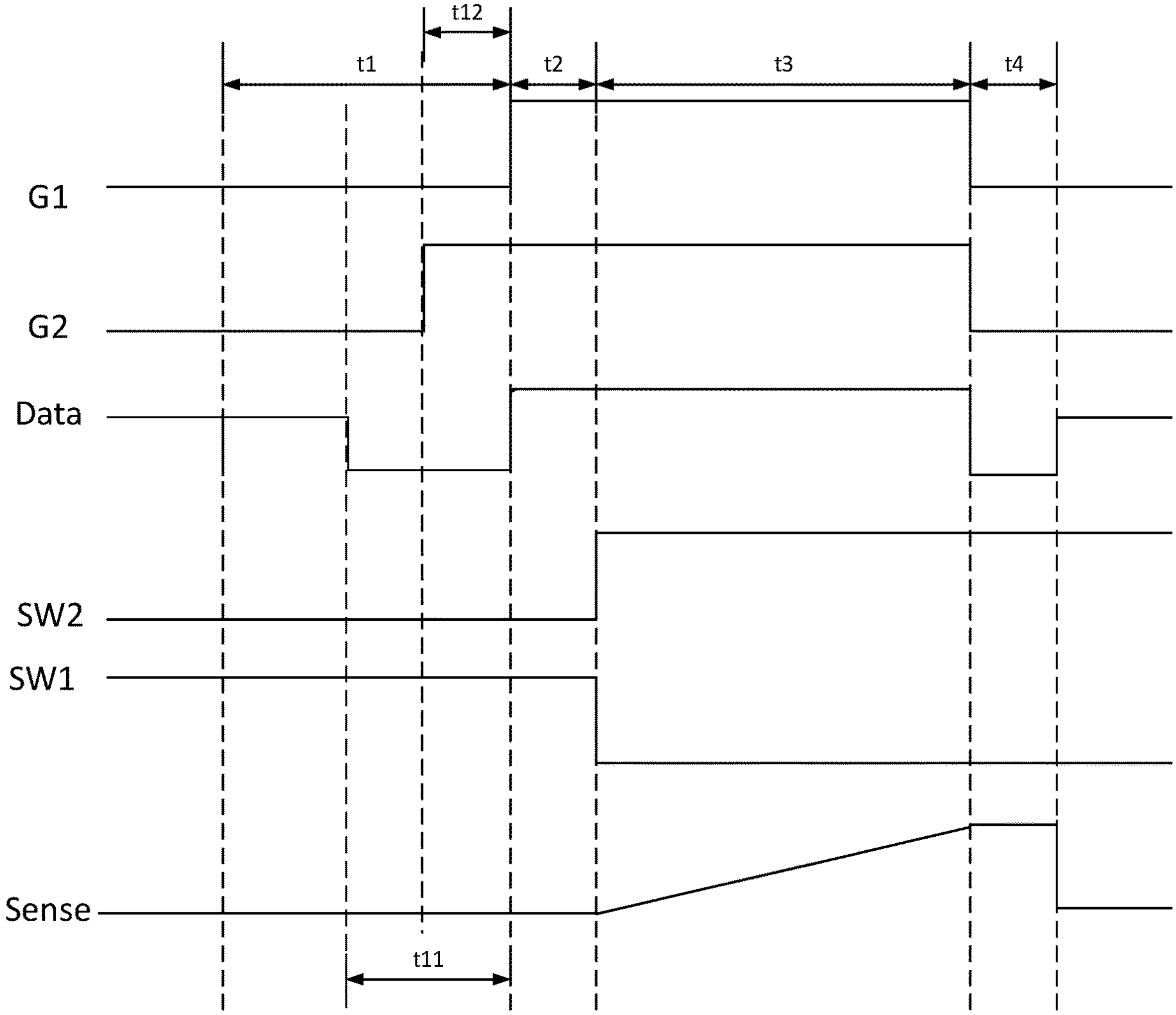
FIG. 5 is a timing diagram for each node in the pixel driving circuit detection method according to another exemplary embodiment of the present disclosure.

As shown in FIG. 5, the timing diagram for each node in the pixel driving circuit detection method according to another exemplary embodiment of the present disclosure. The difference between the pixel driving circuit detection method from the detection method shown in FIG. 4 is that: in the charging phase t3, the first switch sub-circuit 1 is turned on by the first signal control terminal G1. In this detection method, during the charging phase t3, the gate-source voltage difference of the driving transistor DT will gradually decrease, so that the current output by the second terminal of the driving transistor DT will also gradually decrease. In an exemplary embodiment, it can be approximated that the current output by the second terminal of the driving transistor DT is a constant current, so that the mobility K of the driving transistor can also be calculated according to the formula of $I=K(Vgs-Vth)^2=CV/t$. The gate-source voltage difference of the driving transistor may be the detection voltage input by the data signal line to the gate of the driving transistor during the reset phase t2. Similarly, the detection voltage can be equal to the sum of a preset voltage and a threshold voltage, wherein the threshold voltage is the threshold voltage of the driving transistor connected to the data line. In the mobility detection of different driving transistors and in the mobility detection of the same driving transistor for different times, the preset voltage remains the same.

In an exemplary embodiment, the pixel driving circuit may be applied into a display panel, the display panel may include a plurality of pixel driving circuits, and the reference voltage may be greater than the driving voltage of the data line connected to any pixel driving circuit during any initial phase, or the reference voltage may be less than the driving voltage of the data line connected to any pixel driving circuit during any initial phase. This can increase the voltage difference between the data line's own voltage and the target charging voltage, so that data lines with different initial driving voltages can be charged to the same voltage more quickly under the same pull-down or pull-up action.

In an exemplary embodiment, the pixel driving circuit may be used in a display panel, the display panel may include a plurality of pixel driving circuits, and the detection method may include, in at least a part of the initial phase, inputting different reference voltages to the data line for multiple times. Besides, among the two reference voltages inputted adjacently in time, one of the two reference voltages is greater than the driving voltage of the data line connected to any pixel driving circuit in any initial phase, and the other of the two reference voltages is less than the driving voltage of the data line connected to any pixel driving circuit in any initial phase. This can further make the data lines with different initial driving voltages more quickly converge to the same voltage under the same pull-up and pull-down conditions. The principle of the technical effect produced by the above detection method will be described below.

Since the voltage difference between the data line's own voltage and the target charging voltage will affect the change rate of the data line voltage, the greater the voltage difference between the data line's own voltage and the target charging voltage, the faster the voltage change rate on the data line. If the reference voltage is input once, the change rate of the voltage on the data line will become slower and slower, thereby affecting the rate at which the voltage on the data line tends to a consistent value. For example, among the two data lines, when the initial driving voltage of the first data line is −5V and the initial driving voltage of the second data line is 5V, if the first reference voltage is input only once, for example, the first reference voltage is −8V. Assume that the total time required to charge the two data lines to −8V is T. Since the voltage difference between the voltage of the data line itself and the first reference voltage is relatively large in the initial phase of charging, when the data line is charged to the time of T/2, the voltage on the first data line will be less than $V1=(-8V-(-5V))/2+(-5V)=-6.5V$, and the voltage on the second data line will be less than $V2=(-8V-5V)/2+5V=-1.5V$. When the data line is charged to the time of T/2, the voltage difference between the voltage on the first data line and the first reference voltage will be less than $(-5V-(-8V))/2$, and the voltage difference between the voltage on the second data line and the first reference voltage will be less than $(5V-(-8V))/2$. At this time, if the data line is charged to the time of T/2, another second reference voltage is input to the first data line and the second data line respectively, and the second reference voltage is greater than the initial voltage of the first data line and the second data line. For example, the second reference voltage can be 8V. Understandably, when the data line is charged to the time of T/2, the voltage difference between the first data line and the second reference voltage will be greater than the voltage difference between the first data line and the first reference voltage, and the voltage difference between the second data line and the second reference voltage will be greater than the voltage difference between the second data line and the first reference voltage. Therefore, the second reference voltage can charge the voltages on the first data line and the second data line to be consistent within a time period of less than T/2. In this case, the more times of pull-up and pull-down operations, the faster the data lines with different initial driving voltages are charged to the same voltage. In the pull-down operation, the lower the reference voltage, the faster the data lines with different initial driving voltages are charged to the same voltage; and in the pull-up operation, the larger the reference voltage, the faster the data lines with different initial driving voltages are charged to the same voltage.

Figure 6:
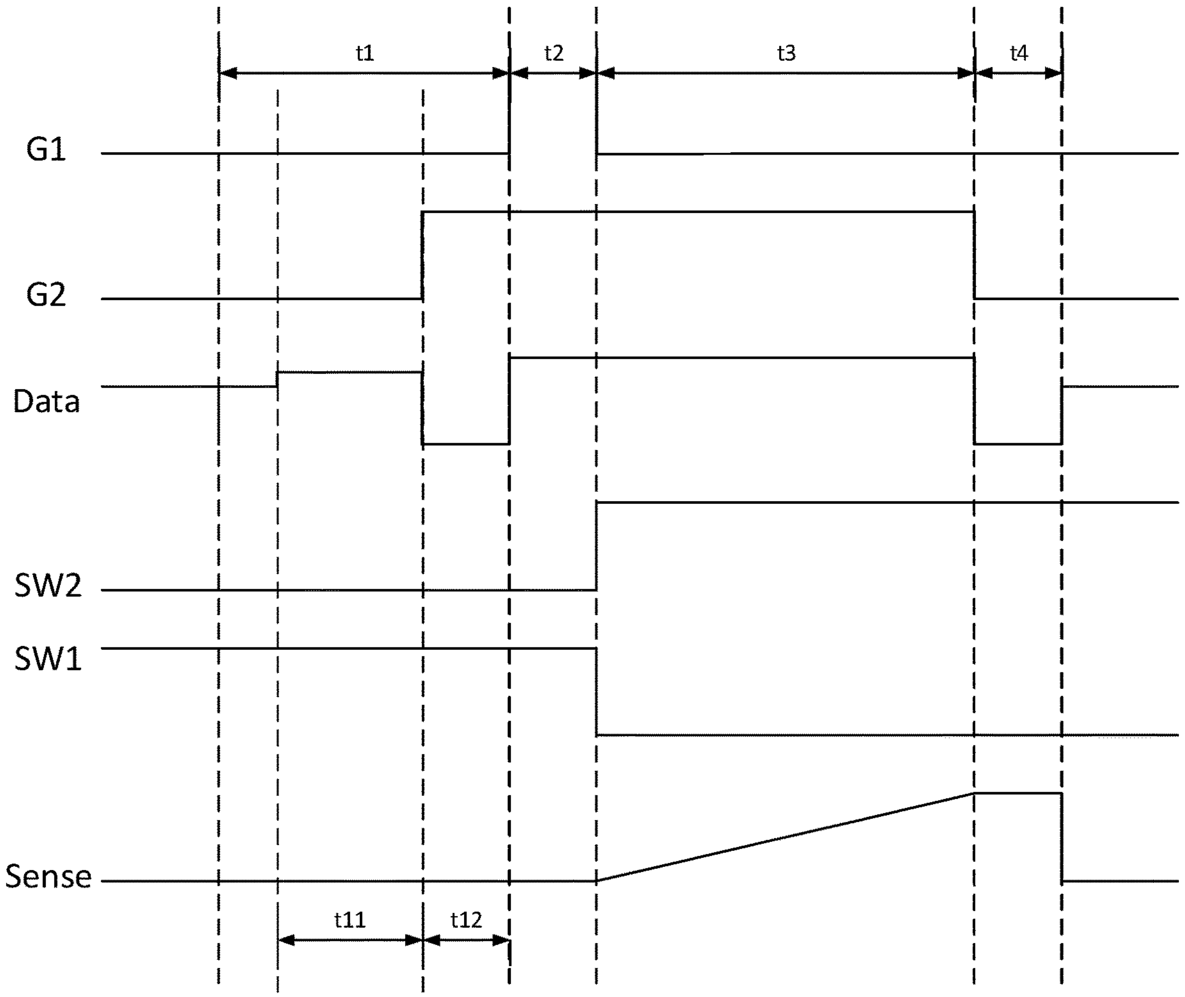
FIG. 6 is a timing diagram for each node in the pixel driving circuit detection method according to another exemplary embodiment of the present disclosure.

As shown in FIG. 6, it is a timing diagram for each node in the pixel driving circuit detection method according to another exemplary embodiment of the present disclosure. In an exemplary embodiment, the input of different reference voltages to the data line for multiple times may include inputting the first reference voltage to the data line in the first period t11; and inputting the second reference voltage to the data line in the second period t12, wherein, the first reference voltage may be greater than the driving voltage of the data line connected to any pixel driving circuit in any initial phase, the second reference voltage may be less than the driving voltage of the data line connected to any pixel driving circuit in any initial phase, and the second reference voltage may be less than the detection voltage input to the data line in this detection phase. It should be understood that in the charging phase t3 in FIG. 6, the first signal control terminal G1 may also output a turn-on signal.

Figure 7:
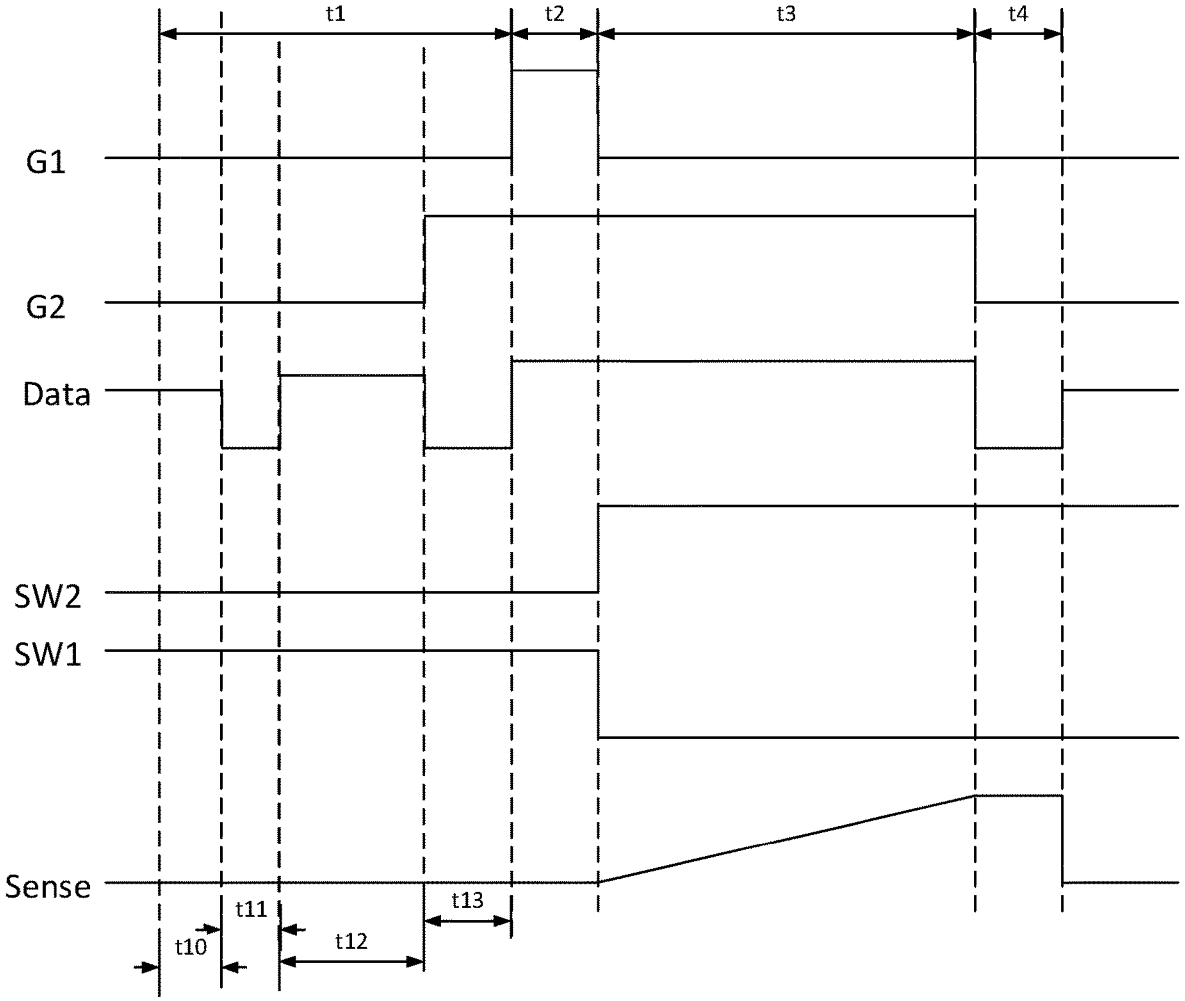
FIG. 7 is a timing diagram for each node in the pixel driving circuit detection method according to another exemplary embodiment of the present disclosure.

As shown in FIG. 7, it is a timing diagram for each node in the pixel driving circuit detection method according to another exemplary embodiment of the present disclosure. In an exemplary embodiment, the input of different reference voltages to the data line for multiple times may further include: inputting a first reference voltage to the data line in a first period t11; and inputting a second reference voltage to the data line in a second period t12; and inputting a third reference voltage to the data line in the third period t13, wherein, the first reference voltage may be less than the driving voltage of the data line connected to any pixel driving circuit in any initial phase, the second reference voltage may be greater than the driving voltage of the data line connected to any pixel driving circuit in any initial phase, the third reference voltage may be less than the driving voltage of the data line connected to any pixel driving circuit in any initial phase, and the third reference voltage may be less than the detection voltage input to the data line in this detection phase. As shown in FIG. 7, the ratio of the time duration of the first period t11 to the time duration of the second period t12 may be 2:4-2:6, for example, 2:4, 2:5, or 2:6. The ratio of the time duration of the second period t12 to the time duration of the third period t13 may be 4:3-6:3, for example, 4:3, 5:3, or 6:3. Specifically, the time duration of the first period t11 may be the time duration for the display panel to drive 2 rows of pixel units, the time duration of the second period t12 may be the time duration for the display panel to drive 5 rows of pixel units, and the time duration of the third period t13 may be the time duration for the display panel to drive 3 rows of pixel units. As shown in FIG. 7, before the first period t11, the initial phase t1 may also include a start period t10. During the start period t10, no reference voltage is input to the data line, and the data line can maintain the data signal of the last row of pixel units in the previous frame, so as to avoid the reference voltage from affecting the light emission of the pixel unit in the last row of the previous frame. The time duration of the start period t10 may be the time duration for the display panel to drive one row of pixel units. In other exemplary embodiments, the detection method shown in FIGS. 4-6 may also set the start period at the start time of the initial phase t1.

It should be understood that, in FIG. 7, the time duration of the first period can be T11, the time duration of the second period can be T12, the time duration of the third period can be T13, the time duration of the reset phase can be T2, the time duration of the charging phase can be T3, and the time duration of the detection period can be T4, wherein $T11: T12=a*(T2: T3)$, where $1<a<2$; $T12: T13=b*(T3: T4)$, where $0<b<1$; and $T11: T12<T13: T12$.

Figure 8:
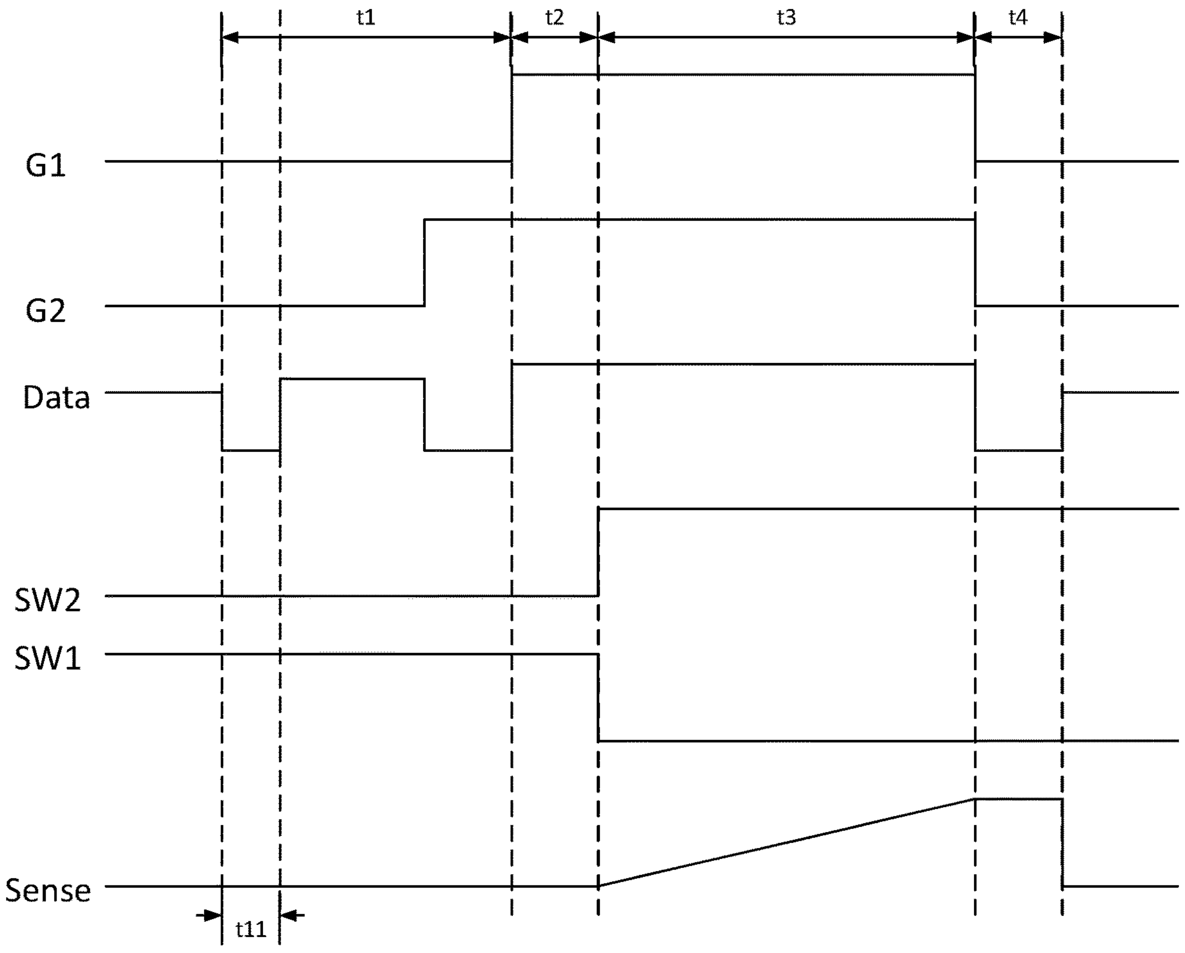
FIG. 8 is a timing diagram for each node in the pixel driving circuit detection method according to another exemplary embodiment of the present disclosure.

As shown in FIG. 8, it is a timing diagram for each node in the pixel driving circuit detection method according to another exemplary embodiment of the present disclosure. The difference between this detection method and the detection method shown in FIG. 7 is that: this detection method controls the first control signal terminal G1 to output a turn-on signal during the charging phase t3. In addition, the first period t11 is located at the initial moment of the initial phase t1. That is, in the initial phase t1, the start period t10 is not set before the first period t11.

Figure 9:
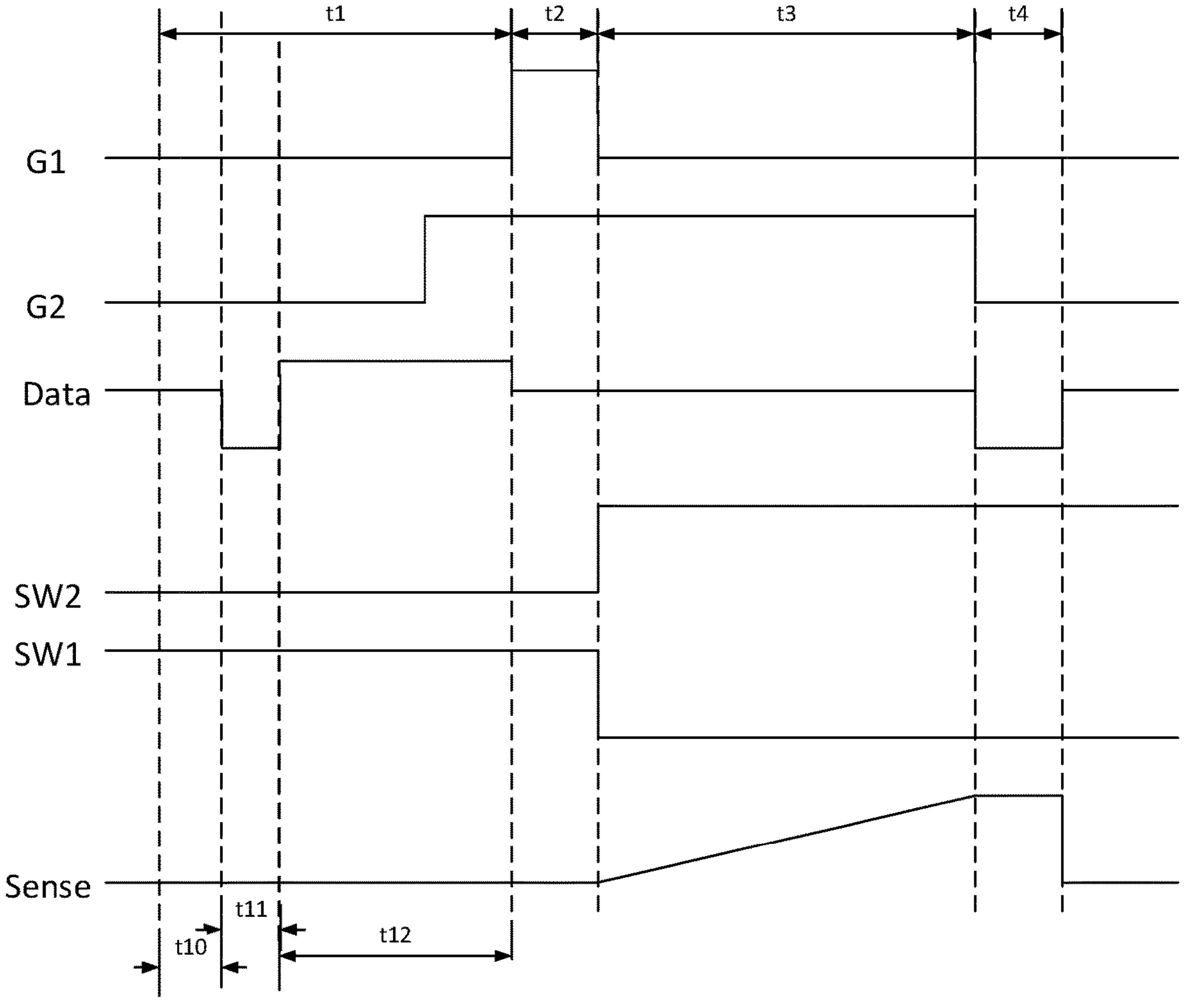
FIG. 9 is a timing diagram for each node in the pixel driving circuit detection method according to another exemplary embodiment of the present disclosure.

As shown in FIG. 9, it is a timing diagram for each node in the pixel driving circuit detection method according to another exemplary embodiment of the present disclosure. In an exemplary embodiment, the input of different reference voltages to the data line for multiple times may include, according to a time sequence: inputting the first reference voltage to the data line in the first period t11; and inputting the second reference voltage to the data line in the second period t12, wherein, the first reference voltage may be less than the driving voltage of a data line connected to any pixel driving circuit in any initial phase, the second reference voltage may be greater than the driving voltage of the data line connected to any pixel driving circuit in any initial phase, and the second reference voltage may be greater than the detection voltage input to the data line in this detection phase. To be specific, the ratio of the time duration of the first period to the time duration of the second period may be 1:2-1:4, for example, 1:2, 1:3, 1:4. The second reference voltage may be equal to 85% of the power supply voltage of the display panel. Specifically, the time duration of the first period t11 may be the time duration for the display panel to drive 1 row of pixel units, and the time duration of the second period t12 may be the time duration for the display panel to drive 13 rows of pixel units. Similarly, as shown in FIG. 9, before the first period t11, the initial phase t1 may also include a start period t10, and the time duration of the start period t10 may be the time duration for the display panel to drive 1 row of pixel units.

It should be understood that, in FIG. 9, the time duration of the first period can be T11, the time duration of the second period can be T12, the time duration of the reset phase can be T2, and the time duration of the charging phase can be T3, wherein $T11: T12=c*(T2: T3)$, where $1<c<2$. In addition, in the charging phase t3 in FIG. 9, the first signal control terminal G1 may also output a turn-on signal.

Figure 10:
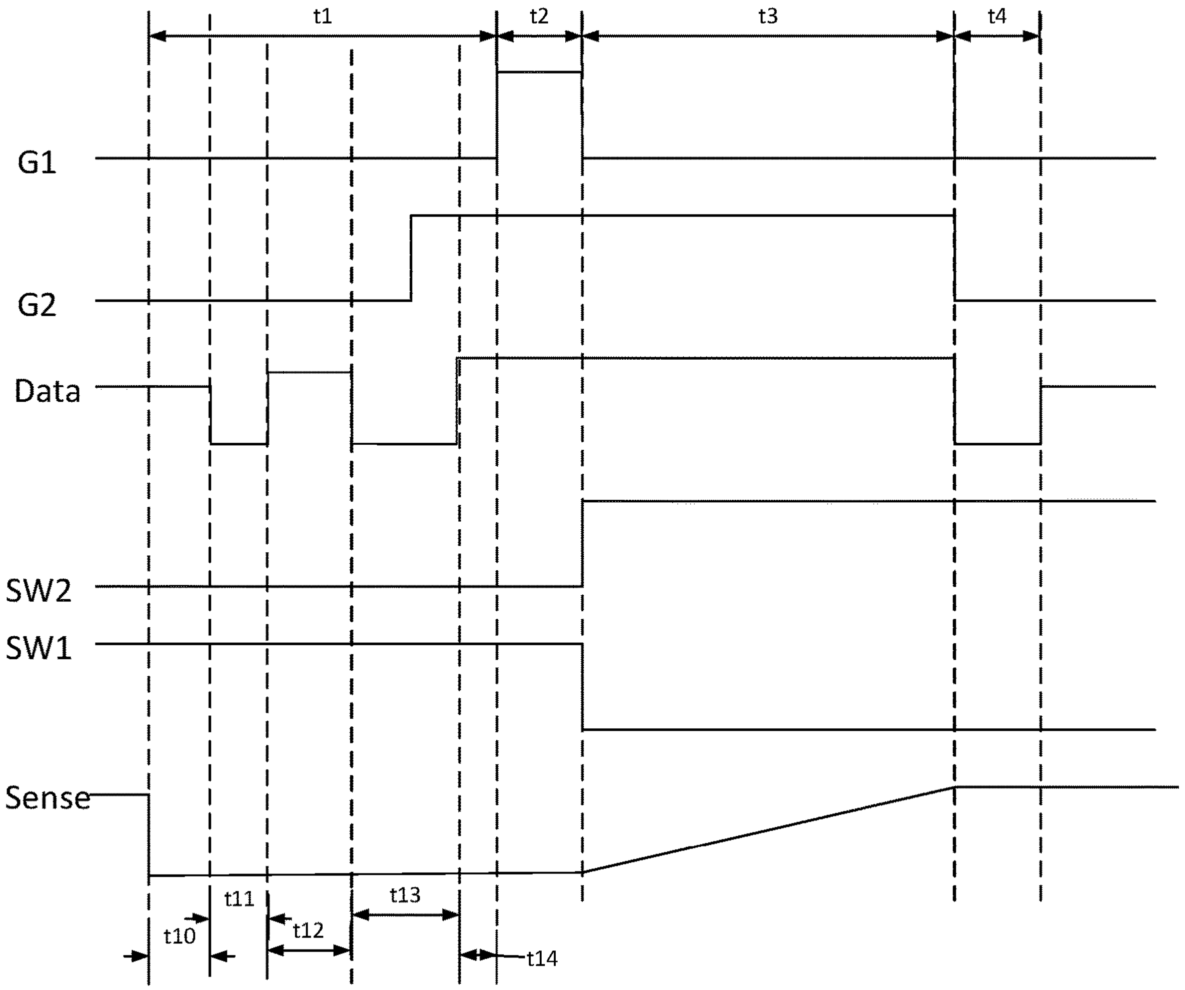
FIG. 10 is a timing diagram for each node in the pixel driving circuit detection method according to another exemplary embodiment of the present disclosure.

As shown in FIG. 10, it is a timing diagram for each node in the pixel driving circuit detection method according to another exemplary embodiment of the present disclosure. In an exemplary embodiment, the input of different reference voltages to the data line for multiple times may include, according to a time sequence, inputting the first reference voltage to the data line in the first period t11; inputting the second reference voltage to the data line in the second period t12; inputting the third reference voltage to the data line in the third period t13; and inputting the fourth reference voltage to the data line in the fourth period t14, wherein, the first reference voltage may be less than the driving voltage of the data line connected to any pixel driving circuit in any initial phase, the second reference voltage may be greater than the driving voltage of the data line connected to any pixel driving circuit in any initial phase, the third reference voltage may be less than the driving voltage of the data line connected to any pixel driving circuit in any initial phase, the fourth reference voltage may be greater than the driving voltage of the data line connected to any pixel driving circuit in any initial phase, and the fourth reference voltage may be equal to the detection voltage input to the data line in this detection phase. Similarly, as shown in FIG. 10, before the first period t11, the initial phase t1 may also include the initial period t10. As shown in FIG. 10, the detection method can also start to reset the sensing line at the initial phase t1, so as to reset the sensing line to the above-mentioned reset voltage. According to the present exemplary embodiment, since the sensing line is started to be reset at the initial phase t1, the voltage of the sensing line before the initial phase is not equal to the reset voltage. In addition, in the charging phase t3 in FIG. 10, the first signal control terminal G1 may also output a turn-on signal.

In an exemplary embodiment, the execution body of the pixel driving circuit detection method may include a source driving circuit (also referred to as Data Driver), a timing controller (TCON), a logic operation circuit that implements at least part of the operation process, a processing set in the display device, and a processor set in an external device connected with the display device. The timing controller may control the source driving circuit to input the reference voltage and the detection voltage to the data line, and the processor may obtain the mobility of the driving transistor according to the voltage of the sensing line detected in the detection phase. The above-mentioned source driving circuit may share the source driving circuit in the display panel, and the above-mentioned timing controller may share the timing controller in the display panel. It should be understood that, in other exemplary embodiments, the execution body of the pixel driving circuit detection method may also be an external device connected to the display device.

An exemplary embodiment of the present disclosure further provides a display panel driving method, the display panel including a plurality of pixel driving circuits, and the display panel driving method includes:

using the aforementioned pixel driving circuit detection method to detect the mobility of driving transistors in different pixel driving circuits; and compensating, in the driving phase, the data signal of the pixel driving circuit where the driving transistor is located according to the mobility of the driving transistor, wherein in the mobility detection of different driving transistors, the reference voltages having the same timing magnitude are input to the data line in the initial phase, and in the mobility detection of the same driving transistor for different times, the reference voltages having the same timing magnitude are input to the data line in the initial phase. That is, any mobility detection of the different pixel driving circuits include the initial phase, the reset phase, the charging phase, and the detection phase. In addition, in any mobility detection of different pixel driving circuits, the same reference voltage needs to be input in the initial phase according to the same reference voltage input method described above. The aforementioned reference voltage input method includes: inputting a reference voltage to the data line once, or inputting different reference voltages to the data line for multiple times.

In an exemplary embodiment, the display panel may further include: a plurality of data lines and a plurality of sensing lines extending in a column direction, a plurality of first gate lines extending in a row direction, and a second gate line, wherein the pixel driving circuits of the same column are connected to the same sensing line and the same data line, and the sensing line and the data line connected to the pixel driving circuits of the same column can be arranged adjacently. That is, the sensing line and the data line connected to the pixel driving circuits of the same column can be in the same black matrix area located between two adjacent pixel units. The control terminals of the first switch sub-circuits in the pixel driving circuits of the same row can be connected to the same first gate line, and the control terminals of the second switch sub-circuits in the pixel driving circuits of the same row can be connected to the same second gate line. The display panel driving method include:

using the first gate line to turn on the first switch sub-circuits row by row, and using the second gate line to turn on the second switch sub-circuits row by row, so that the pixel driving circuit detection method described above is used to perform detection on the pixel driving circuits row by row. For example, as shown in FIG. 4, the first gate line can turn on the first switch sub-circuit in the same row of pixel driving circuits at phases t2 and t3, and the second gate line can turn on the second switch sub-circuit in the same row of pixel driving circuits at phases t12, t2, and t3, thus realizing a simultaneous detection of the row of pixel driving circuits.

In an exemplary embodiment, the initial phase, the reset phase, the charging phase, and the detection phase may be located in the blank phases between adjacent frames, and the display panel driving method may include: in each blank phase, performing detection on at least one row of the pixel driving circuits. Since the time duration of the blank phase is relatively short, only a part of rows of the pixel driving circuits can be detected in each blank phase. For example, only one row of pixel driving circuits can be detected in each blank phase.

An exemplary embodiment of the present disclosure also provides a display panel that is driven by the above-mentioned display panel driving method. The display panel can be used in display devices such as mobile phones, TVs, and tablet computers.

Figure 11:
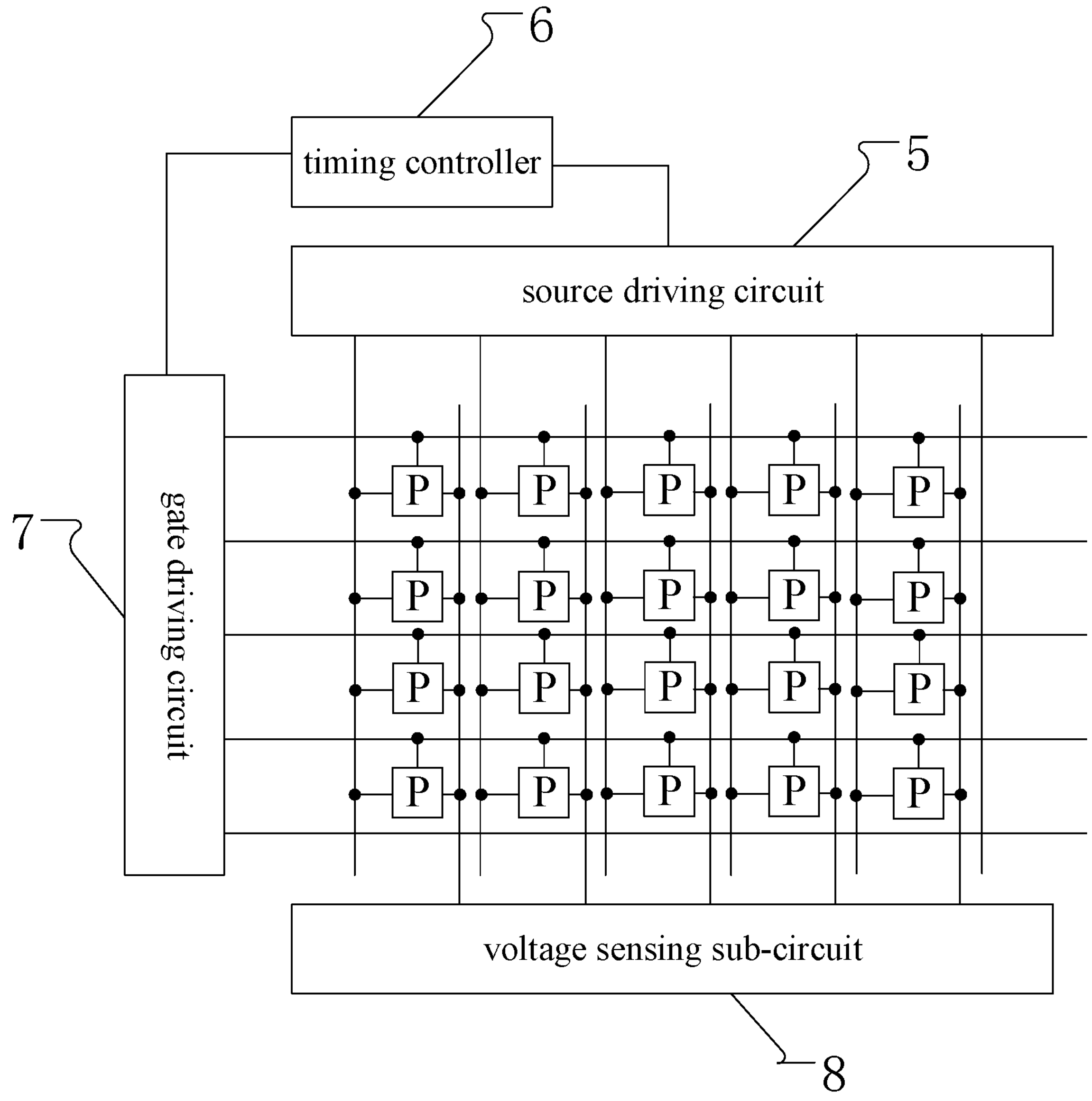
FIG. 11 is a schematic structural diagram of display device according to an exemplary embodiment of the present disclosure.
Figure 12:
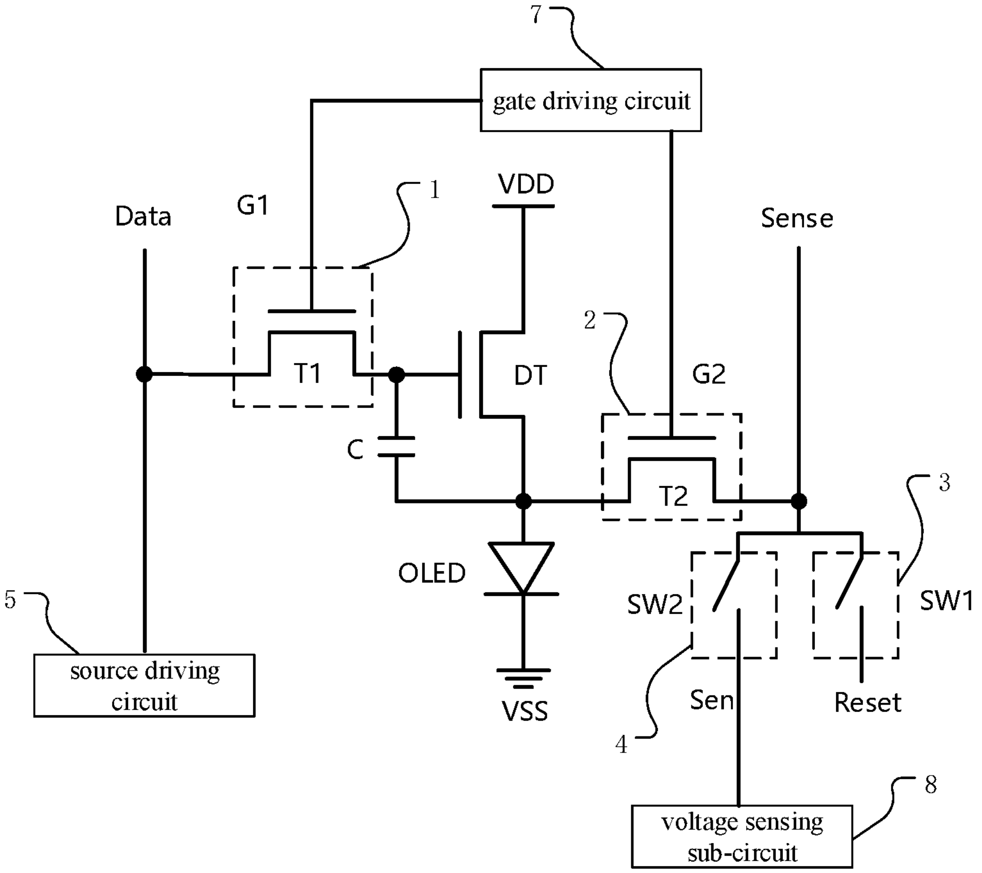
FIG. 12 is a schematic structural diagram of a part of the display device according to an exemplary embodiment of the present disclosure.

An exemplary embodiment of the present disclosure also provides a display device, as shown in FIGS. 11 and 12. FIG. 11 is a schematic structural diagram of the display device according to an exemplary embodiment of the present disclosure, and FIG. 12 is a schematic structural diagram of a part of the display device according to an exemplary embodiment of the present disclosure. The display device may include a plurality of sub-pixel units P and a detection sub-circuit, wherein each sub-pixel unit may include a pixel driving circuit. As shown in FIG. 12, the pixel driving circuit may include: a second switch sub-circuit 2, a driving transistor DT, a first switch sub-circuit 1, and a capacitor C. The second terminal of the second switch sub-circuit 2 is connected to the sensing line Sense; the first terminal of the driving transistor DT is connected to the first power terminal VDD, and the second terminal of the driving transistor DT is connected to the first terminal of the second switch sub-circuit 2. The first terminal of the first switch sub-circuit 1 is connected to the data line Data, and the second terminal of the first switch sub-circuit 1 is connected to the gate of the driving transistor DT. An electrode of the capacitor C is connected to the gate of the driving transistor DT. The detection sub-circuit can be used to perform the above-mentioned pixel driving circuit detection method to detect the mobility of the driving transistor. The pixel driving circuit may have the same structure as the pixel driving circuit in FIG. 3. The detection sub-circuit further includes: a third switch sub-circuit 3 and a fourth switch sub-circuit 4. The first terminal of the third switch sub-circuit 3 can be connected to the sensing line Sense, the second terminal of the third switch sub-circuit 3 can be connected to the reset signal terminal Reset, the control terminal of the third switch sub-circuit 3 can be connected to the first control signal terminal SW1. The first terminal of the fourth switch sub-circuit can be connected to the sensing line Sense, the second terminal of the fourth switch sub-circuit can be connected to the sensing signal terminal Sen, and the control terminal of the fourth switch sub-circuit can be connected to the second control signal terminal SW2.

In an exemplary embodiment, as shown in FIGS. 11 and 12, the detection sub-circuit may include: a source driving circuit 5, a timing controller 6, and a processor (not shown). The source driving circuit 5 may be connected to the pixel driving circuit through the data line Data. The timing controller 6 is connected to the source driving circuit 5 for controlling the source driving circuit 5 to input the reference voltage and the detection voltage to the data line Data. The processor is configured to obtain the mobility of the driving transistor according to the voltage of the sensing line detected in the detection phase. The source driving circuit 5 in the detection sub-circuit can share the source driving circuit for providing data signals in the display panel, and the timing controller 6 in the detection sub-circuit can share the timing controller for providing timing control signals in the display panel. The processor can be integrated into the main circuit board in the display panel. As shown in FIGS. 11 and 12, the detection sub-circuit can also share the gate driving circuit 7 in the display panel, so as to provide gate driving signals to the first switch sub-circuit 1 and the second switch sub-circuit 2. The detection sub-circuit may further include a voltage sensing sub-circuit 8 for sensing the voltage on the sensing line, and the voltage sensing sub-circuit may also be integrated into the source driving circuit.

Those skilled in the art will easily think of other embodiments of the present disclosure after considering the specification and practicing the present disclosure disclosed herein. This application is intended to cover any variations, uses, or adaptive changes of the present disclosure. These variations, uses, or adaptive changes follow the generality of the present disclosure, and include common knowledge or customary technical means in the technical field that are not disclosed in the present disclosure. The description and the embodiments are only regarded as exemplary, and the true scope and spirit of the present disclosure are pointed out by the claims.

It should be understood that the present disclosure is not limited to the precise structure that has been described above and shown in the drawings, and various modifications and changes can be made without departing from its scope. The scope of the present disclosure is limited only by the appended claims.

The invention claimed is:

1. A pixel driving circuit, comprising: a driving transistor; a first switch sub-circuit, having a first terminal connected to a sensing line; and a detection sub-circuit, for detecting a mobility of the driving transistor in the pixel driving circuit, wherein the detection sub-circuit is configured to: during a source reset phase, input a reset voltage to the sensing line while turning on the first switch sub-circuit, wherein the driving transistor has a first terminal connected to a first power terminal and a second terminal connected to a second terminal of the first switch sub-circuit; wherein the pixel driving circuit further comprises: a second switch sub-circuit, having a first terminal connected to a data line and a second terminal connected to a gate of the driving transistor; and a capacitor, having an electrode connected to the gate of the driving transistor, wherein the detection sub-circuit is further configured to: input a reference voltage to the data line during at least a part of an initial phase, so that an initial voltage on the data line changes toward the reference voltage, wherein the reference voltage is different from the initial voltage; turn on the first switch sub-circuit and the second switch sub-circuit during a reset phase, to input a detection voltage to the data line, while inputting the reset voltage to the sensing line; turn on the first switch sub-circuit during a charging phase, to input a driving current by the driving transistor to the sensing line under the effect of the detection voltage; turn off the first switch sub-circuit and the second switch sub-circuit during a detection phase, to detect a voltage on the sensing line; and obtain the mobility of the driving transistor according to the voltage on the sensing line detected during the detection phase, wherein the initial phase comprises the source reset phase, wherein the first terminal of the first switch sub-circuit is further connected to a first control signal terminal and a second control signal terminal, and a first signal at the first control signal terminal is a high-level turn-on signal during an entirety of the initial phase and the reset phase, but changes to be a low-level turn-off signal during an entirety of the charging phase and the detection phase, and a second signal at the second control signal terminal is a low-level turn-off signal during the entirety of the initial phase and the reset phase, but changes to be a high-level turn-on signal during the entirety of the charging phase and the detection phase, and the charging phase and the detection phase are two successive phases following directly the reset phase.

2. The pixel driving circuit according to claim 1, wherein in detection of the mobility of the same driving transistor for different times, the detection sub-circuit inputs the reference voltages having the same timing magnitude to the data line.

3. The pixel driving circuit according to claim 1, wherein the initial phase, the reset phase, the charging phase, and the detection phase are located in blank phases between adjacent frames, and at an initial moment of the initial phase, the data line maintains a driving voltage of the pixel driving circuit in the last row of a previous frame, and wherein the reference voltage is greater than the driving voltage of the data line connected to the pixel driving circuit during the initial phase, or the reference voltage is less than the driving voltage of the data line connected to the pixel driving circuit during the initial phase.

4. The pixel driving circuit according to claim 3, wherein the detection sub-circuit is configured to input different reference voltages to the data line for multiple times during at least a part of the initial phase; and among the two reference voltages inputted adjacently in time, one of the two reference voltages is greater than the driving voltage of the data line connected to the pixel driving circuit during the initial phase, and the other of the two reference voltages is less than the driving voltage of the data line connected to the pixel driving circuit during the initial phase.

5. The pixel driving circuit according to claim 4, wherein the input of different reference voltages to the data line for multiple times comprises: according to a time sequence, inputting a first reference voltage to the data line during a first period; and inputting a second reference voltage to the data line during a second period, wherein the first reference voltage is greater than the driving voltage of the data line connected to the pixel driving circuit during the initial phase, and the second reference voltage is less than the driving voltage of the data line connected to the pixel driving circuit during the initial phase.

6. The pixel driving circuit according to claim 4, wherein the input of different reference voltages to the data line for multiple times comprises: according to a time sequence, inputting a first reference voltage to the data line during a first period;

inputting a second reference voltage to the data line during a second period; and inputting a third reference voltage to the data line during a third period, wherein the first reference voltage is less than the driving voltage of the data line connected to the pixel driving circuit during the initial phase, the second reference voltage is greater than the driving voltage of the data line connected to the pixel driving circuit during the initial phase, and the third reference voltage is less than the driving voltage of the data line connected to the pixel driving circuit during the initial phase.

7. The pixel driving circuit according to claim 6, wherein the first period has a time duration of T11, the second period has a time duration of T12, the third period has a time duration of T13, the reset phase has a time duration of T2, the charging phase has a time duration of T3, and the detection phase has a time duration of T4, wherein $$T11:T12=a*(T2:T3), \text{ where } 1<a<2;$$

$$T12:T13=b*(T3:T4), \text{ where } 0<b<1; \text{ and}$$

$$T11:T12<T13:T12.$$

8. The pixel driving circuit according to claim 6, wherein a ratio of the time duration of the first period to the time duration of the second period is 2:4-2:6; and a ratio of the time duration of the second period to the time duration of the third period is 4:3-6:3.

9. The pixel driving circuit according to claim 4, wherein the input of different reference voltages to the data line for multiple times comprises: according to a time sequence, inputting a first reference voltage to the data line during a first period; and inputting a second reference voltage to the data line during a second period, wherein the first reference voltage is less than the driving voltage of the data line connected to the pixel driving circuit during the initial phase, and the second reference voltage is greater than the driving voltage of the data line connected to the pixel driving circuit during the initial phase.

10. The pixel driving circuit according to claim 9, wherein the first period has a time duration of T11, the second period has a time duration of T12, the reset phase has a time duration of T2, and the charging phase has a time duration of T3, wherein $$T11:T12=c*(T2:T3), \text{ where } 1<c<2.$$

11. The pixel driving circuit according to claim 9, wherein a ratio of the time duration of the first period to the time duration of the second period is 1:2-1:4.

12. The pixel driving circuit according to claim 1, wherein obtaining the mobility of the driving transistor according to the voltage on the sensing line detected during the detection phase, comprises:

calculating the mobility K of the driving transistor according to the formula of $I=K(Vgs-Vth)^2=CV/t$, where I represents an output current of the driving transistor during the charging phase, Vgs represents a gate-source voltage difference of the driving transistor, Vth represents a threshold voltage of the driving transistor, C represents a capacitance value of the sensing line itself, V represents the voltage on the sensing line detected during the detection phase, and t represents a time duration of the charging phase.

13. The pixel driving circuit according to claim 1, wherein the detection voltage input to the data line is equal to the sum of a preset voltage and a threshold voltage, wherein the threshold voltage is a threshold voltage of the driving transistor connected to the data line; and in detection of the mobility of the same driving transistor for different times, the preset voltage remains the same.

14. The pixel driving circuit according to claim 1, wherein the detection sub-circuit comprises:

a source driving circuit, connected to the pixel driving circuit through the data line; and a timing controller, connected to a source driving circuit and configured to control the source driving circuit to input the reference voltage and the detection voltage to the data line.

15. The pixel driving circuit according to claim 1, wherein the detection sub-circuit comprises:

a third switch sub-circuit, having a first terminal connected to the sensing line, a second terminal connected to a reset signal terminal, and a control terminal connected to a first control signal terminal; and a fourth switch sub-circuit, having a first terminal connected to the sensing line, a second terminal connected to a sensing signal terminal, and a control terminal connected to a second control signal terminal, wherein the reset signal terminal is configured to input the reset voltage to the sensing line, and the sensing signal terminal is configured to sense a voltage on the sensing line.

16. A display panel, comprising a plurality of pixel driving circuits, wherein each pixel driving circuit comprises: a driving transistor; a first switch sub-circuit, having a first terminal connected to a sensing line; and a detection sub-circuit, for detecting a mobility of the driving transistor in the pixel driving circuit, wherein the detection sub-circuit is configured to: during a source reset phase, input a reset voltage to the sensing line while turning on the first switch sub-circuit, wherein the driving transistor has a first terminal connected to a first power terminal and a second terminal connected to a second terminal of the first switch sub-circuit; and wherein each pixel driving circuit further comprises: a second switch sub-circuit, having a first terminal connected to a data line and a second terminal connected to a gate of the driving transistor; and a capacitor, having an electrode connected to the gate of the driving transistor, wherein the detection sub-circuit is further configured to: input a reference voltage to the data line during at least a part of an initial phase, so that an initial voltage on the data line changes toward the reference voltage, wherein the reference voltage is different from the initial voltage; turn on the first switch sub-circuit and the second switch sub-circuit during a reset phase, to input a detection voltage to the data line, while inputting the reset voltage to the sensing line; turn on the first switch sub-circuit during a charging phase, to input a driving current by the driving transistor to the sensing line under the effect of the detection voltage; turn off the first switch sub-circuit and the second switch sub-circuit during a detection phase, to detect a voltage on the sensing line; and obtain the mobility of the driving transistor according to the voltage on the sensing line detected during the detection phase, wherein the initial phase comprises the source reset phase, wherein the first terminal of the first switch sub-circuit is further connected to a first control signal terminal and a second control signal terminal, and a first signal at the first control signal terminal is a high-level turn-on signal during an entirety of the initial phase and the reset phase, but changes to be a low-level turn-off signal during an entirety of the charging phase and the detection phase, and a second signal at the second control signal terminal is a low-level turn-off signal during the entirety of the initial phase and the reset phase, but changes to be a high-level turn-on signal during the entirety of the charging phase and the detection phase, and the charging phase and the detection phase are two successive phases following directly the reset phase.

17. The display panel according to claim 16, wherein in detection of the mobility of different driving transistors, the detection sub-circuit inputs the reference voltages having the same timing magnitude to the data line, and in detection of the mobility of the same driving transistor for different times, the detection sub-circuit inputs the reference voltages having the same timing magnitude to the data line.

18. The display panel according to claim 16, wherein the detection voltage input to the data line is equal to the sum of a preset voltage and a threshold voltage, wherein the threshold voltage is a threshold voltage of the driving transistor connected to the data line; and in detection of the mobility of different driving transistors and in detection of the mobility of the same driving transistor for different times, the preset voltage remains the same.

* * * * *